(12) United States Patent
Brewster et al.

(10) Patent No.: US 10,029,604 B2
(45) Date of Patent: Jul. 24, 2018

(54) RATCHET LOAD BINDER TIE DOWN ANCHOR APPARATUS AND METHODS OF USING THE SAME

(71) Applicant: Holland LP, Crete, IL (US)

(72) Inventors: John B. Brewster, Homewood, IL (US); Christopher Roberts, Elwood, IL (US)

(73) Assignee: Holland, L.P., Crete, IL (US)

( * ) Notice: Subject to any disclaimer, the term of this patent is extended or adjusted under 35 U.S.C. 154(b) by 0 days.

(21) Appl. No.: 15/350,208

(22) Filed: Nov. 14, 2016

(65) Prior Publication Data

US 2017/0182927 A1  Jun. 29, 2017

Related U.S. Application Data

(60) Provisional application No. 62/267,695, filed on Dec. 15, 2015, provisional application No. 62/324,167, filed on Apr. 18, 2016, provisional application No. 62/331,765, filed on May 4, 2016.

(51) Int. Cl.
*B60P 7/08* (2006.01)

(52) U.S. Cl.
CPC .............. *B60P 7/083* (2013.01); *B60P 7/0853* (2013.01)

(58) Field of Classification Search
CPC ........ B60P 7/083; B60P 7/0853; F16G 11/12; F16G 15/00
USPC ......... 410/12, 96–98, 100, 103, 116, 21–23; 403/43, 45–48; 24/69 T, 69 WT, 68 CD, 24/68 CT, 299, 265 CD
See application file for complete search history.

(56) References Cited

U.S. PATENT DOCUMENTS

| | | | | |
|---|---|---|---|---|
| 2,848,259 | A | * | 8/1958 | Huber ..................... B60P 3/073 403/46 |
| 4,082,469 | A | * | 4/1978 | Symborski .......... C03B 37/0209 403/24 |
| 4,573,842 | A | * | 3/1986 | Mantela ................. B60P 3/079 410/23 |
| 7,399,148 | B2 | * | 7/2008 | Bruun ..................... B63B 25/24 410/85 |
| 2008/0118324 | A1 | * | 5/2008 | Fritel ..................... F16G 11/12 410/100 |

* cited by examiner

*Primary Examiner* — Stephen Gordon
(74) *Attorney, Agent, or Firm* — Scherrer Patent & Trademark Law, P.C.; Stephen T. Scherrer; Monique A. Morneault (57) ABSTRACT

The present invention relates to a chain telescoping ratchet load binder tensioner apparatus useful for utilizing, for example, as tie-downs for heavy equipment on the decks of railcars, trucks, or other vehicles, although the invention should not be limited to its preferred application. More specifically, the present invention relates to a chain telescoping ratchet load binder tensioner apparatus for tensioning and holding a chain, such as a ½" chain, and for tensioning the chain for the afore-mentioned tie-down applications. In addition, the present invention comprises a ratchet load binder tie down anchor apparatus comprises an end link and a swivel allowing the ratchet load binder to swivel about a central axis. Methods of use are further provided.

16 Claims, 11 Drawing Sheets

RATCHET LOAD BINDER TIE DOWN ANCHOR APPARATUS AND METHODS OF USING THE SAME

The present invention claims priority to U.S. Provisional Patent App. No. 62/267,695, titled "Telescoping Ratchet Load Binder Tie Down Apparatus and Methods of Using the Same", filed Dec. 15, 2015, U.S. Provisional Patent App. No. 62/324,167, titled "Ratchet Load Binder Tie Down Apparatus and Methods of Using the Same", filed Apr. 18, 2016, and U.S. Provisional Patent App. No. 62/331,765, titled "Multi-Purpose Chain Tie Down Assembly, System and Methods of Using the Same", filed May 4, 2016, each of which is incorporated herein by reference in its entirety.

TECHNICAL FIELD

The present invention relates to a tie down apparatus useful for utilizing, for example, as tie-downs for heavy equipment on the decks of railcars, trucks, or other vehicles, although the invention should not be limited to its preferred application. More specifically, the present invention relates to a telescoping ratchet load binder (turnbuckle) apparatus for tightening and holding a chain, such as a ½" chain, and for tensioning the chain for the afore-mentioned tie-down applications. In addition, the present invention comprises a ratchet load binder tie down anchor apparatus comprises an end link and a swivel allowing the ratchet load binder to swivel about a central axis. Methods of use are further provided.

BACKGROUND

Winches, turnbuckles or tensioners are typically used in tie-down applications for heavy equipment. The transport of heavy equipment, such as military equipment, construction equipment, agricultural equipment, or other like equipment is frequently accomplished over rails, on vehicles such as trucks, via water transport, such as on rivers, canals, and/or seas or oceans. It is typically desirable to ensure that the heavy equipment is securely tied down so that the heavy equipment does not move or shift during transport thereof.

The heavy equipment is further typically positioned on a deck of a transporter, such as the deck of a cargo ship, railcar, truck or other like transporter, and lengths of chain are typically attached to the heavy equipment, or a support frame thereof, and tied down to the deck of the transporter. Frequently, chains of sufficient load-bearing capability are utilized to ensure that the chains securely hold the heavy equipment without breaking.

To ensure that the heavy equipment does not move or shift on the deck of the transporter, the chains may typically be tensioned via tensioners or winches. For example, FIG. 1 illustrates a prior art ratchet load binder tensioner 10 that consists of a binder adjuster 12, locking sleeve 11, first end eye bolt 13 consisting of threads 15 and eye provision 17, second end eye bolt 14 consisting of threads 16 and eye provision 18.

Figures 1, 2:
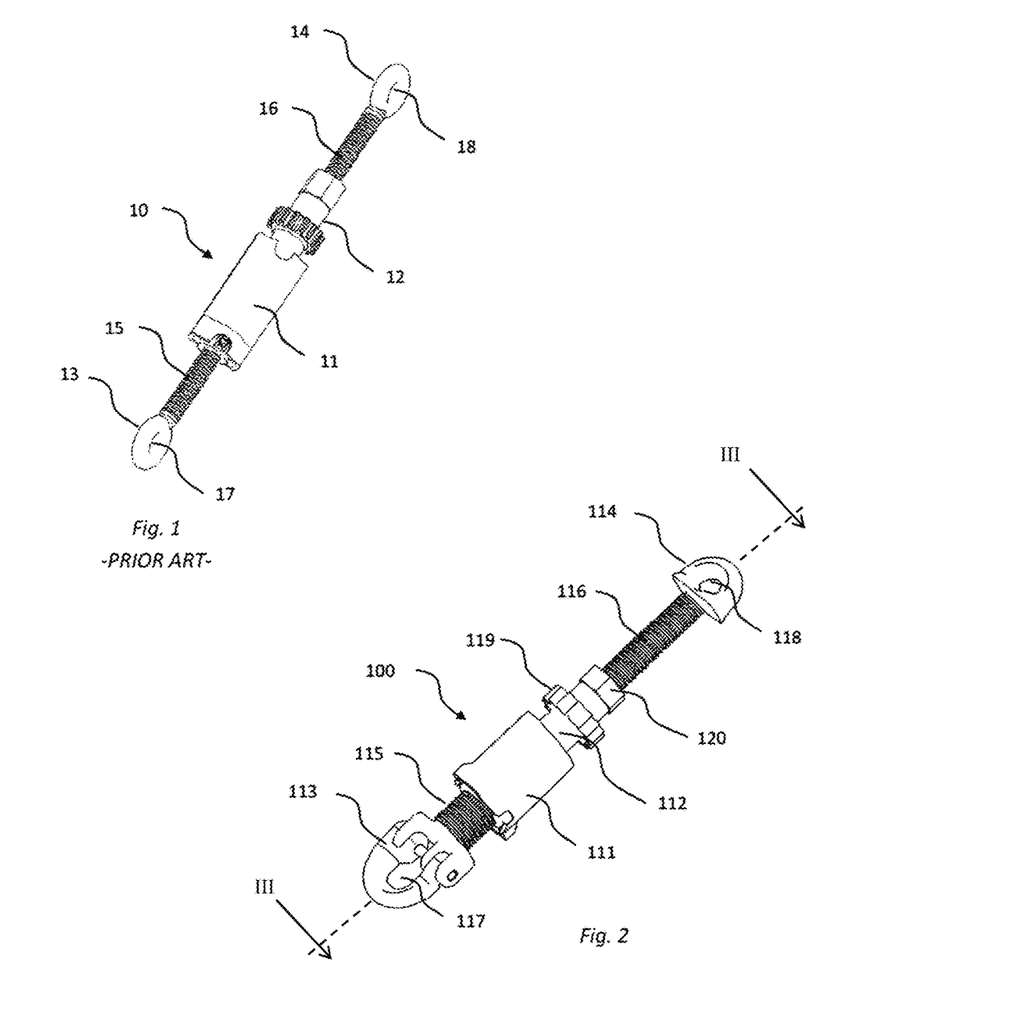
FIG. 1 illustrates a perspective view of a prior art ratchet load binder tensioner.
FIG. 2 illustrates a perspective view of a telescoping ratchet load binder tensioner in an embodiment of the present invention, extended.

FIG. 1 illustrates a prior art ratchet load binder tensioner 10 that may be attached to a chain for tensioning the chain as it is attached to the heavy equipment. The ratchet load binder tensioner 10 may be interconnected to the deck (not shown) of a transporter, on an eye provision 17 thereof and attached to a chain (not shown) on the second eye provision 18 thereof. The ratchet load binder adjuster 12 may be twisted around threads 15, 16 on an eyebolts 13, 14 allowing the ratchet load binder 10 to pull the chain (not shown) downwardly toward the deck (not shown) of a transporter, thereby tensioning the chain as it is attached to heavy equipment or another like item.

The ratchet load binder tensioner 10, as illustrated in FIG. 1, may have a locking sleeve 11 that is shown in the unlocked position, used to lock ratchet load binder adjuster 12 to first end eyebolt 13 preventing the loosening of the ratchet load binder tensioner 10.

The ratchet load binder tensioner 10, as illustrated in FIG. 1, may have a relatively large load-bearing breaking point, such as up to about 55,000 pounds, for example. However, the ratchet load binder tensioner 10 may have a relatively long length profile, and may be difficult to utilize in applications where low clearance is provided between the deck and the heavy equipment. Moreover, the tensioning capability is only as long as the eyebolt threaded shaft, so the amount of tensioning in chain distance pull may be limited.

In tie-down applications it may be advantageous, compared to the ratchet load binder tensioner 10 described above, to provide tensioning capability but with a shorter length profile than what the ratchet load binder tensioner 10 is capable of providing.

A need exists, therefore, for chain tensioning apparatus and methods of using the same that may be utilized to tie down heavy equipment. More specifically, a need exists for a chain tensioning apparatus and methods of using the same that may have sufficient strength so as to be relied upon to consistently tie down heavy equipment without breakage thereof during use.

Further, a need exists for a chain tensioning apparatus and methods of using the same that provides a shorter length profile to not interfere with heavy equipment with low ground clearance. Still further, a need exists for a chain tensioning apparatus and methods of using the same that may be contained within existing decks of transporters, yet have a degree of freedom in rotation so that the same may be utilized as needed to tie down heavy equipment.

Figure 5:
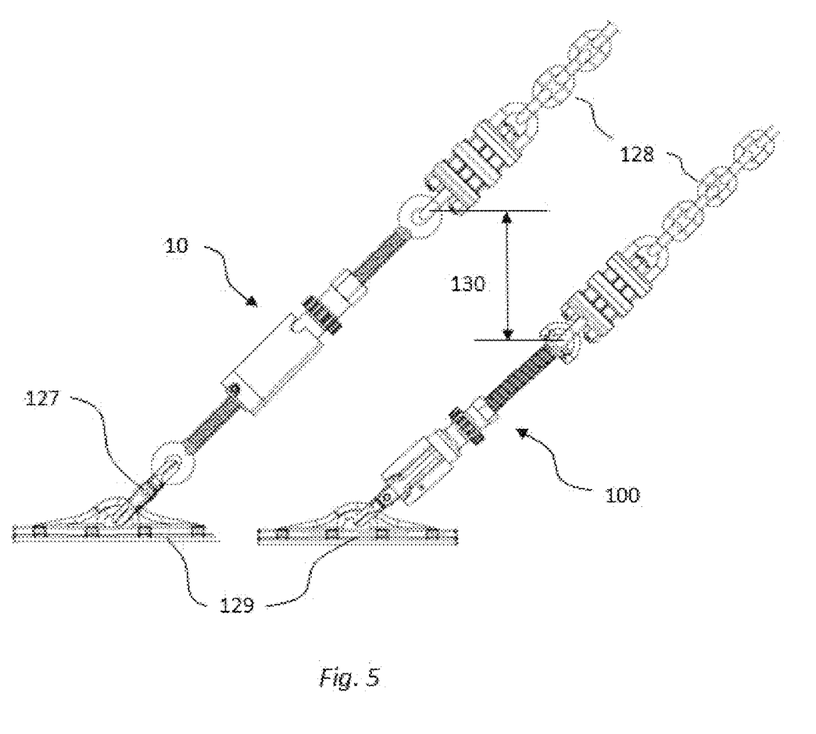
FIG. 5 illustrates a side perspective view of an extended prior art ratchet load binder tensioner, in combination with an extended telescoping ratchet load binder tensioner of the present invention compared to a prior art apparatus.
Figure 12:
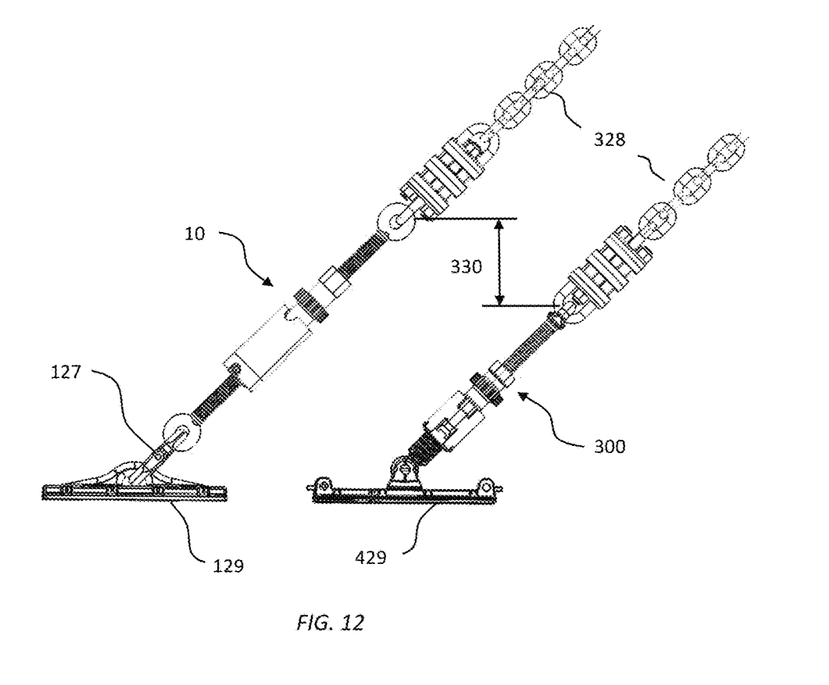
FIG. 12 illustrates a side perspective view of an extended prior art ratchet load binder tensioner, in combination with an extended telescoping ratchet load binder tensioner of the present invention compared to a prior art apparatus.

In addition, as illustrated in FIG. 1, FIG. 5 and FIG. 12, illustrating the prior art ratchet load binder tensioner 10, the tensioner 10 may be interconnected to a deck via eye bolt 13, which may be connected to anchor hardware 129 which may include an aperture or loop through which the eye provision 17 is connected. However, anchor hardware 129 is relatively bulky and oftentimes can protrude above a deck and fail to provide necessary clearance equipment requiring low ground clearance.

A need, therefore, further exists for a ratchet load binder tie down anchor apparatus and methods of using the same that provides additional ground clearance by providing a relatively compact anchor apparatus and tie down binder apparatus when used together. Specifically, a need exists for a ratchet load binder tie down anchor apparatus and methods of using the same whereby the anchor aids a tie down binder apparatus, such as the telescoping ratchet load binder tie down apparatus described herein, in providing necessary clearance for equipment requiring low ground clearance.

SUMMARY OF THE INVENTION

The present invention relates to a telescoping ratchet load binder tensioning apparatus that can telescope to a relatively great length useful for utilizing, for example, as tie-downs for heavy equipment on the decks of railcars, trucks, or other vehicles, although the invention should not be limited to its preferred application. More specifically, the present invention relates to a telescoping ratchet load binder apparatus for tensioning and holding a chain, such as a ½" chain, and for tensioning the chain for the afore-mentioned tie-down applications. In addition, the present invention comprises a ratchet load binder tie down anchor apparatus comprising an end link and a swivel allowing the ratchet load binder to swivel about a central axis. Methods of use are further provided.

To this end, in an embodiment of the present invention, a telescoping ratchet load binder tensioning apparatus is provided. The telescoping ratchet load binder tensioning apparatus comprises essentially three parts: (1) a first end including a ring shaped portion and threaded shaft portion; (2) a length adjuster which is, essentially, a cylinder with 2 internal threads that oppose each other, with external provisions for application of tools for rotating the length adjuster; (3) a second end including an attachment provision portion and a tubular portion which is threaded on its external diameter. The telescoping ratchet load binder is formed by threadedly engaging the threaded shaft of the first end to the internal diameter of the length adjuster and threadedly engaging the opposite internal diameter of the length adjuster with the tubular portion of the second end. The threaded shaft portion, the length adjuster and the tubular portion rotate about a common rotational axis. The length of the telescoping ratchet load binder apparatus may be altered by rotationally immobilizing the first end and the second end and turning the length adjuster about the rotational axis. The shortest length for the invention is obtained when all the external threads are threaded as far inside the internally threaded features that will be allowed.

Specifically, in an embodiment of the present invention, a telescoping ratchet load binder tensioning apparatus is provided. The apparatus comprises: a first end comprising a first connector and first threaded shaft portion; a second end comprising a second connector and a second threaded shaft portion, wherein the second threaded shaft portion comprises an internal cavity configured to receive the first threaded shaft portion; and a length adjuster housing comprising first mating threads on a first inside surface of a first end of the housing and second mating threads on a second inside surface of a second end of the housing, wherein the first mating threads mate with the first threaded shaft portion and the second mating threads mate with the second threaded shaft portion, wherein turning the housing about the first and second threaded shaft portions in a first direction causes the first threaded shaft portion to move directionally toward the second threaded shaft portion.

In an embodiment, the first connector is an eye bolt.
In an embodiment, the second connector is an eye bolt.
In an embodiment, the first threaded shaft portion comprises a first thread pitch and the second threaded shaft portion comprises a second thread pitch, wherein the first thread pitch and the second thread pitch are different.
In an embodiment, the first thread pitch is greater than the second thread pitch.
In an embodiment, the telescoping ratchet load binder tensioning apparatus further comprises: a contracted configuration, wherein the first threaded shaft portion is disposed within the internal cavity of the second threaded portion.
In an embodiment, the telescoping ratchet load binder tensioning apparatus further comprises: an extended configuration, wherein the first threaded shaft portion is disposed away from the second threaded portion.
In an embodiment, the second connector is connected to a deck of a transporter vehicle.

In an embodiment, the telescoping ratchet load binder tensioning apparatus further comprises: an anchor connected to the second connector.
In an embodiment, the anchor comprises a swivel connected to the second connector, wherein the swivel turns about a vertical axis.
In an embodiment, the swivel turns 360 degrees about the vertical axis.
In an embodiment, the anchor comprises a pin disposed through the second connector thereby connecting the second connector to the anchor, wherein the second connector rotates about the pin.
In an embodiment, the telescoping ratchet load binder tensioning apparatus further comprises: a chain assembly connected to the first connector, the chain assembly connected to an item for transport.

In an alternate embodiment of the present invention, a method of tying down an item for transport is provided. The method comprises the steps of: providing a vehicle having a deck and an item for transporting on the vehicle; providing a telescoping ratchet load binder tensioning apparatus comprising a first end comprising a first connector and first threaded shaft portion, the first connector connected to a chain assembly connected to the item; a second end comprising a second connector and a second threaded shaft portion, the second connector connected to the deck of the vehicle, wherein the second threaded shaft portion comprises an internal cavity configured to receive the first threaded shaft portion; and a length adjuster housing comprising first mating threads on a first inside surface of a first end of the housing and second mating threads on a second inside surface of a second end of the housing, wherein the first mating threads mate with the first threaded shaft portion and the second mating threads mate with the second threaded shaft portion, wherein turning the housing about the first and second threaded shaft portions in a first direction causes the first threaded shaft portion to move directionally toward the second threaded shaft portion; and turning the housing and moving the first threaded shaft portion directionally toward the second threaded shaft portion, thereby tensioning the chain assembly and tying down the item.

In an embodiment, turning the housing also causes the second threaded shaft portion to move directionally toward the first threaded shaft portion at the same time that the first threaded shaft portion moves directionally toward the second threaded shaft portion.

In an embodiment, the method further comprises the step of: turning the housing such that the first threaded shaft portion enters the internal cavity of the threaded shaft portion.

In an embodiment, the second connector is connected to the deck via an anchor.
In an embodiment, the anchor comprises a swivel connected to the second connector, wherein the swivel turns about a vertical axis.
In an embodiment, the swivel turns 360 degrees about the vertical axis.
In an embodiment, the anchor comprises a pin disposed through the second connector thereby connecting the second connector to the anchor, wherein the second connector rotates about the pin.

It is, therefore, an advantage and objective of the present invention to provide a chain tensioning apparatus and methods of using the same that may be utilized to tie down heavy equipment.

More specifically, it is an advantage and objective of the present invention to provide a chain tensioning apparatus and methods of using the same that may have sufficient strength so as to be relied upon to consistently tie down heavy equipment without breakage thereof during use.

Further, it is an advantage and objective of the present invention to provide a chain tensioning apparatus and methods of using the same that provides a shorter length profile to not interfere with heavy equipment with low ground clearance.

Still further, it is an advantage and objective of the present invention to provide a chain tensioning apparatus and methods of using the same that may be contained within existing decks of transporters, yet have a degree of freedom in rotation so that the same may be utilized as needed to tie down heavy equipment.

In addition, it is an advantage and objective of the present invention to provide a ratchet load binder tie down anchor apparatus and methods of using the same that provides additional ground clearance by providing a relatively compact anchor apparatus and tie down binder apparatus when used together.

Specifically, it is an advantage and objective of the present invention to provide a ratchet load binder tie down anchor apparatus and methods of using the same whereby the anchor aids a tie down binder apparatus, such as the telescoping ratchet load binder tie down apparatus described herein, in providing necessary clearance for equipment requiring low ground clearance.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a telescoping ratchet load binder tensioner apparatus useful for utilizing, for example, as tie-downs for heavy equipment on the decks of railcars, trucks, or other vehicles, although the invention should not be limited to its preferred application. More specifically, the present invention relates to a telescoping ratchet load binder tensioner apparatus for tensioning and holding a chain, such as a ½" chain, and for tensioning the chain for the aforementioned tie-down applications. In addition, the present invention comprises a ratchet load binder tie down anchor apparatus comprises an end link and a swivel allowing the ratchet load binder to swivel about a central axis. Methods of use are further provided.

Now referring to the figures, wherein like numerals refer to like parts, FIG. 2 illustrates a perspective view of a telescoping ratchet load binder tensioner apparatus 100 in an embodiment of the present invention in a fully extended position.

The telescoping ratchet load binder tensioner 100 may be interconnected to the deck (not shown) of a transporter, on an eye provision 117 thereof and attached to a chain (not shown) on the second eye provision 118 thereof. The telescoping ratchet load binder adjuster 112 may be twisted around threads 115, 116 on an end connector assembly 113 and eyebolt 114 allowing the telescoping ratchet load binder 100 to pull the chain (not shown) downwardly toward the deck (not shown) of a transporter, thereby tensioning the chain as it is attached to heavy equipment or another like item.

The locking sleeve 111 is shown in the raised position and seated in the un-locked position allowing the length adjuster to be rotated. The telescoping ratchet load binder length adjuster 112 provides ratchet teeth 119 and hex 120 on the outside diameter of the telescoping ratchet load binder length adjuster 112 so the telescoping ratchet load binder length adjuster 112 can be rotated about the rotational axis.

Figure 3:
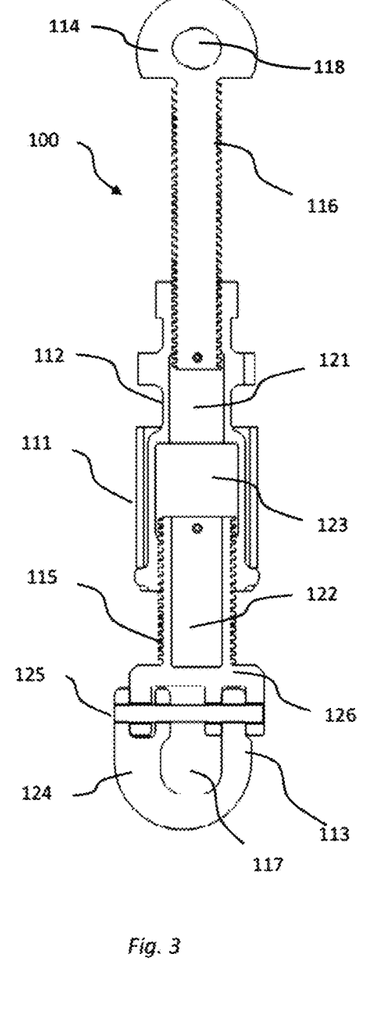
FIG. 3 illustrates a cross-sectional view of a telescoping ratchet load binder tensioner along line III-III in an embodiment of the present invention, extended.

FIG. 3 illustrates a cross-sectional view along lines III-III of FIG. 2 of the telescoping ratchet load binder tensioner apparatus 100 in an embodiment of the present invention in a fully extended position. The telescoping ratchet load binder length adjuster 112 is illustrated as cylindrically hollow with two internal cavities 121, 123 which allow space for the threaded portions 115, 116 when they are rotationally translated into the telescoping ratchet load binder length adjuster 112. Internal cavity 123 may have threads on at least part of an internal surface thereof matching threads on threaded portion 115, thereby mating with threaded portion 115. Likewise, internal cavity 121 may have threads on at least part of an internal surface thereof matching threads on threaded portion 116. The telescoping ratchet load binder tensioner apparatus 100 is capable of further retracting action beyond what prior art is capable of because threaded portion 116 may retract into an internal cylindrical cavity 122 of the second threaded portion 115 to further shorten telescoping ratchet load binder tensioner apparatus 100, as illustrated in FIG. 4.

To further the desire for a chain tensioning apparatus and methods of using the same that provides a shorter length profile to not interfere with heavy equipment with low ground clearance, the end connector assembly 113 shown in FIG. 3, consists of an end link 124 and a pin 125 to connect the end link 124 to the end head 126. The end connector assembly 113 eliminates the need for an additional connector coupling 127 shown in the prior art device in FIG. 5, for connecting the telescoping ratchet load binder tensioner apparatus 10 to the deck (not shown) of a transporter.

The telescoping ratchet load binder tensioner 100 may connect to hardware (not shown) that may be disposed on a deck of a transporter, such as a railcar, a truck bed, a transportation ocean-going ship, or any other vehicle or transporter apparent to one of ordinary skill in the art.

Figure 4:
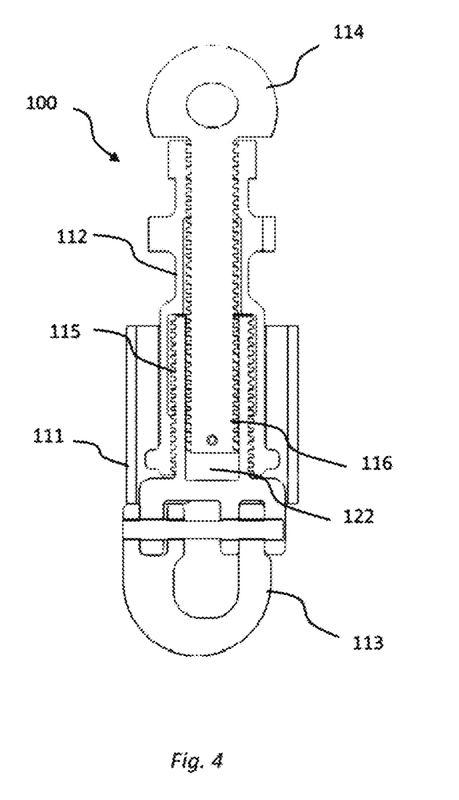
FIG. 4 illustrates a cross-sectional view of a telescoping ratchet load binder tensioner in an embodiment of the present invention, at its shortest length.

FIG. 4 illustrates a cross-sectional view of the telescoping ratchet load binder tensioner 100 at its shortest length. The telescoping ratchet load binder adjuster 112 has been turned around threaded portions 115, 116 on an end connector assembly 113 and eyebolt 114 allowing the telescoping ratchet load binder 100 to shorten to its shortest length. As the telescoping ratchet load binder adjuster 112 is turned, both threaded portions 115, 116 may move in opposite directions. Therefore, when the adjuster 112 is turned one direction, the threaded portion 116 may move downwardly into the adjuster 112 (relative to the adjuster 112) and the threaded portion 115 may move upwardly into the adjuster 112 (relative to the adjuster 112). If turned sufficiently, the threaded portion 116 may further retract into the internal cylindrical cavity 122 of the threaded portion 115, as illustrated in FIG. 4.

Although the threaded portions 115, 116 are described as moving "upwardly" and "downwardly", it should be noted that this movement is relative to the adjuster 112. In certain situations, such as the situation illustrated in FIG. 5, for example, the threaded portion 115 may be attached to an anchor, such as anchor 129, not allowing the threaded portion 115 to move upwardly or downwardly. In such a situation, adjuster 112, in actuality, moves upwardly and downwardly relative to the threaded portion 115, instead of the threaded portion 115 moving upwardly and downwardly relative to the adjuster 112. However, for convenience, the present invention describes movement of the threaded portions 115, 116 relative to the adjuster 112, and the invention should not be limited as described herein.

The locking sleeve 111 is shown, in FIG. 4, lowered onto the end connector assembly 113 of the telescoping ratchet load binder 100 resulting in rotationally locking the two components together preventing further twisting.

FIG. 5 illustrates a side perspective view of various embodiments of a system utilizing chain 128 and anchor hardware 129 along with a fully extended prior art ratchet load binder tensioner apparatus 10, compared with a fully extended telescoping ratchet load binder tensioner apparatus 100 of the present invention. The comparison illustrates how the additional telescoping feature of the threaded portion 116 into the cavity 122, and the addition of an end connector assembly 113, provides an improvement of the present apparatus over a prior art apparatus by providing a chain tensioning apparatus that provides a tie down with a shorter length profile providing a means to secure equipment with low ground clearance.

Specifically, FIG. 5 shows distance 130 that further illustrates the advantage of the shorter length profile of the present apparatus providing additional clearance so as to accommodate equipment with lower ground clearance.

Figure 6:
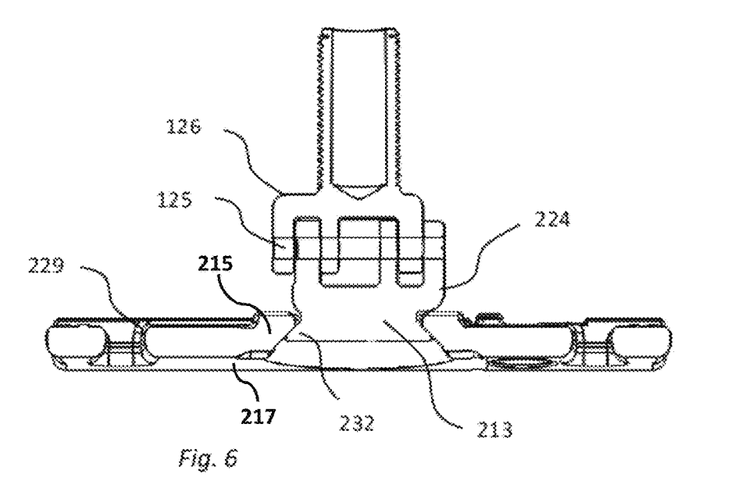
FIG. 6 illustrates a side cut-away view of a swivel anchor apparatus connected with a telescoping ratchet load binder tensioner in an alternate embodiment of the present invention.
Figure 7:
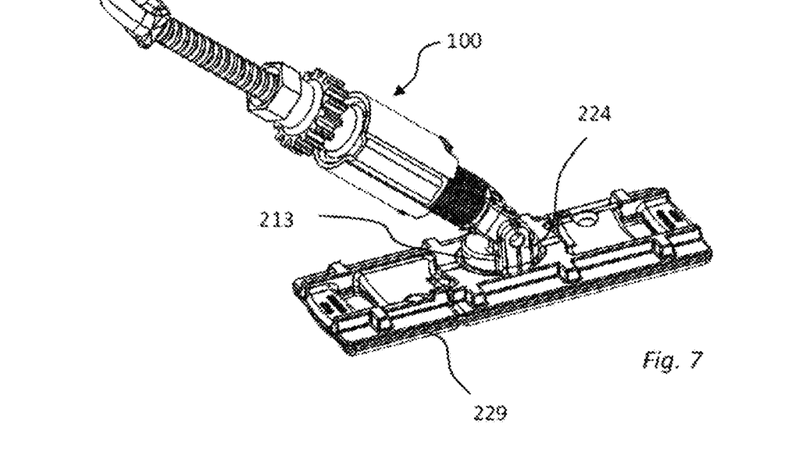
FIG. 7 illustrates a perspective view of a telescoping ratchet load binder tensioner in combination with a swivel anchor apparatus in an alternate embodiment of the present invention, with the telescoping ratchet load binder tensioner rotated or swiveled about a central axis of the swivel anchor apparatus and positioned in a longitudinal direction.
Figure 8:
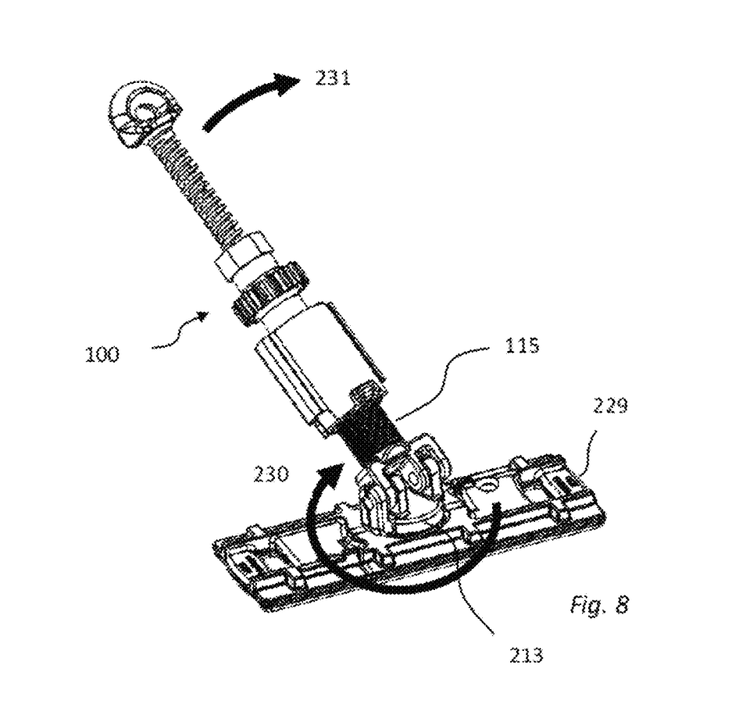
FIG. 8 illustrates a perspective view of a telescoping ratchet load binder tensioner in combination with a swivel anchor apparatus in an alternate embodiment of the present invention, with the telescoping ratchet load binder tensioner rotated or swiveled about a central axis of the swivel anchor apparatus and positioned in a lateral direction.

FIG. 6 illustrates a cross-sectional view of an anchor 229 in an alternate embodiment of the present invention, and as further illustrated in FIGS. 7 and 8. The anchor 229 may provide a connection point for a tie down binder, such as the telescoping ratchet load binder tie down apparatus of the present invention, as described above, but may also be utilized with other ratchet load binder tie downs, and the invention should not be limited as described herein.

The anchor 229 and components thereof may provide a swivel 213 allowing a 360 degree freedom of movement about a central vertical axis for a ratchet load binder tie down. The swivel 213 may provide an end link 224 and a conical surface in the anchor 229. The swivel 213, therefore, is free to rotate about a vertical central axis in the anchor 229. The conical surface of the swivel 213 may be held by a mating conically-shaped plate 215 disposed thereover, and a base plate 217 disposed therebeneath holding the swivel 213 is position within the anchor 229.

The end link 224 of the swivel 213 may connect to the end head 126 of the telescoping ratchet load binder tie down apparatus, or other binder tie down apparatus, via pin 125, illustrated in FIG. 3 as connected to end link 124. Thus, the pin 125 allows the ratchet load binder tie down apparatus to swivel upwardly and downwardly on a horizontal axis through pin 125. As described above, the swivel 213 allows 360 degree swiveling of the tie down apparatus about the central axis thereof, and with the movement of the apparatus along horizontal axis through pin 125, the ratchet load binder apparatus may be swiveled and moved into any desired position.

FIG. 7 illustrates a perspective view of a telescoping ratchet load binder tensioner 100 in combination with swivel 213 of anchor 229 in the alternate embodiment of the present invention. As shown in FIG. 7, the tensioner 100 may be positioned in a longitudinal direction with respect to the anchor 229, where the longitudinal direction is the direction of the lengthwise direction of the anchor 229.

The swivel 213 may allow the tensioner 100 to swivel therearound, as illustrated in FIG. 8, illustrating the tensioner 100 positioned in a lateral direction relative to the lengthwise direction of the anchor 229.

Figure 9:
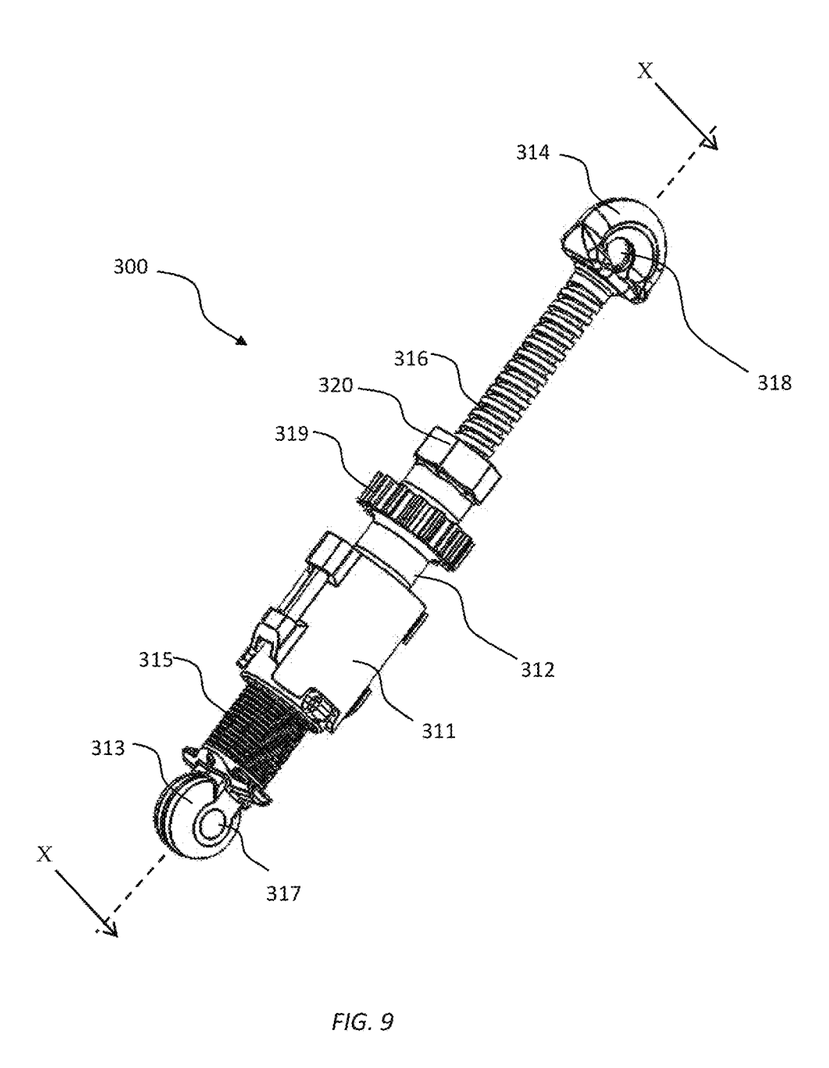
FIG. 9 illustrates a perspective view of a telescoping ratchet load binder tensioner in an alternate embodiment of the present invention, extended.

Now referring to FIGS. 9-15, a still further alternate embodiment of the present invention is shown and described. Specifically, FIG. 9 illustrates a perspective view of a telescoping ratchet load binder tensioner apparatus 300 in a fully extended position.

The telescoping ratchet load binder tensioner 300 may be interconnected to the deck (not shown) of a transporter, on an eye provision 317 thereof and attached to a chain (not shown) on the second eye provision 318 thereof. A telescoping ratchet load binder adjuster 312 may be twisted around threads 315, 316 on an end connector assembly 313 and eyebolt 314 allowing the telescoping ratchet load binder 300 to pull the chain (not shown) downwardly toward the deck (not shown) of a transporter, thereby tensioning the chain as it is attached to heavy equipment or another like item.

A locking sleeve 311 is shown in the raised position and seated in the un-locked position allowing the length adjuster to be rotated. The telescoping ratchet load binder length adjuster 312 provides ratchet teeth 319 and hex 320 on the outside diameter of the telescoping ratchet load binder length adjuster 312 so the telescoping ratchet load binder length adjuster 312 can be rotated about a rotational axis.

Figure 10:
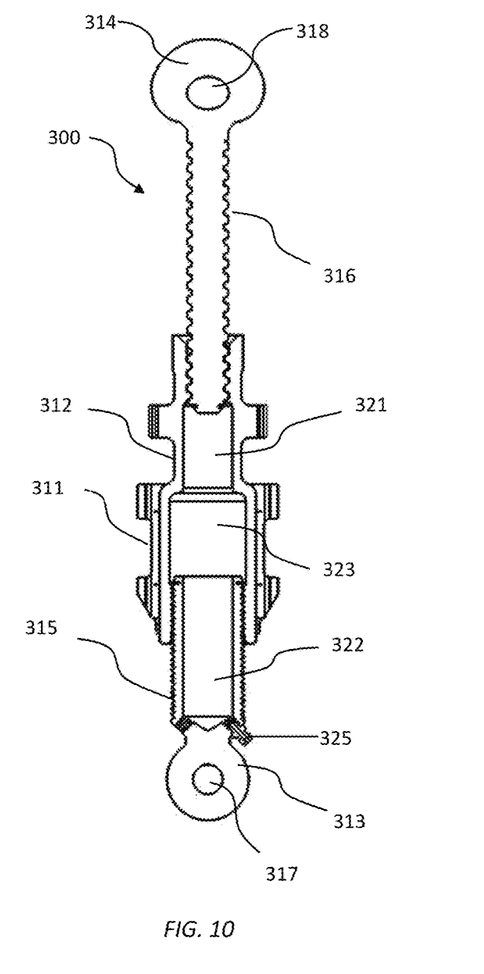
FIG. 10 illustrates a cross-sectional view of a telescoping ratchet load binder tensioner along line X-X in an alternate embodiment of the present invention, extended.

FIG. 10 illustrates a cross-sectional view along lines X-X of FIG. 9 of the telescoping ratchet load binder tensioner apparatus 300 in an embodiment of the present invention in a fully extended configuration. The telescoping ratchet load binder length adjuster 312 is illustrated as cylindrically hollow with two internal cavities 321, 323 which allow space for the threaded portions 315, 316 when they are rotationally translated relative to the telescoping ratchet load binder length adjuster 312. Internal cavity 323 may have threads on at least part of an internal surface thereof matching threads on threaded portion 315, thereby mating with threaded portion 315. Likewise, internal cavity 321 may have threads on at least part of an internal surface thereof matching threads on threaded portion 316. The telescoping ratchet load binder tensioner apparatus 300 is capable of further retracting action beyond what prior art is capable of because threaded portion 316 may retract into an internal cylindrical cavity 322 within the threaded portion 315 to further shorten telescoping ratchet load binder tensioner apparatus 300, as illustrated in FIG. 11.

The telescoping ratchet load binder tensioner 300 may connect to hardware (as illustrated in FIG. 12-15) that may be disposed on a deck of a transporter, such as a railcar, a truck bed, a transportation ocean-going ship, or any other vehicle or transporter apparent to one of ordinary skill in the art.

Figure 11:
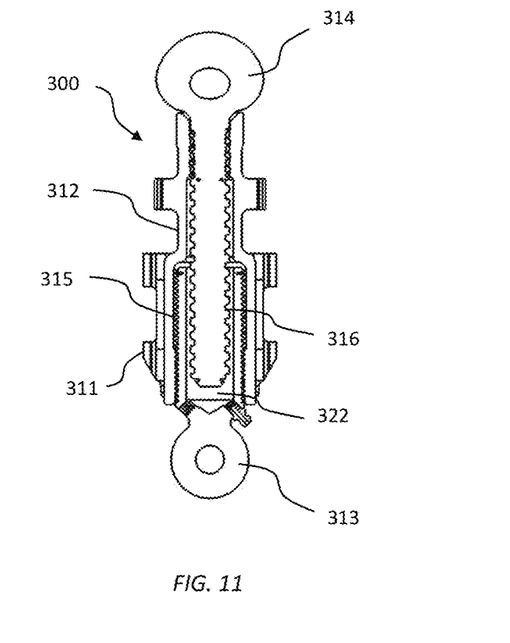
FIG. 11 illustrates a cross-sectional view of a telescoping ratchet load binder tensioner in an alternate embodiment of the present invention, at its shortest length.

FIG. 11 illustrates a cross-sectional view of the telescoping ratchet load binder tensioner 300 at its shortest length. The telescoping ratchet load binder adjuster 312 has been turned around threaded portions 315, 316 on an end connector assembly 313 and eyebolt 314 allowing the telescoping ratchet load binder 300 to shorten to its shortest length. As the telescoping ratchet load binder adjuster 312 is turned, both threaded portions 315, 316 may move in opposite directions, relative to the adjuster 312. Therefore, when the adjuster 312 is turned one direction, the threaded portion 316 may move downwardly (relative to the adjuster 312) into the adjuster 312 and the threaded portion 315 may move upwardly (relative to the adjuster 312) into the adjuster 312. If turned sufficiently, the threaded portion 316 may further retract into the internal cylindrical cavity 322 of the threaded portion 315, as illustrated in FIG. 11. In an embodiment, the threaded portion 315 may have a thread pitch that is the same as the thread pitch of the threaded portion 316. Thus, the rate of the movement of the adjuster along the threaded portions 315, 316 may be the same. Preferably, the threaded portion 315 may have a thread pitch that is different than the thread pitch of the threaded portion 316. For example, the threaded portion 316 may have a thread pitch that is larger than the thread pitch of the threaded portion 315 so that the rate the adjuster 312 moves relative to the threaded portion 316 is greater than the rate the adjuster 312 moves relative to the threaded portion 315. This may allow the threaded portion 316 to extend to a greater extent from the adjuster 312 than the threaded portion 315 as the adjuster is turned in a first direction. Likewise, this may allow the threaded portion 316 to retract at a faster rate relative to the adjuster 312 than the threaded portion 315 when the adjuster is turned in a second direction. Alternatively, the threaded portion 315 may have a thread pitch that is larger than the thread pitch of the threaded portion 316 so that the rate the adjuster 312 moves relative to the threaded portion 315 is greater than the rate the adjuster 312 moves relative to the threaded portion 316. This may allow the threaded portion 315 to extend to a greater extent from the adjuster 312 than the threaded portion 316 as the adjuster is turned in a first direction. Likewise, this may allow the threaded portion 315 to retract at a faster rate relative to the adjuster 312 than the threaded portion 316 when the adjuster is turned in a second direction.

Although the threaded portions 315, 316 are described as moving "upwardly" and "downwardly", it should be noted that this movement is relative to the adjuster 312. In certain situations, such as the situation illustrated in FIG. 12, for example, the threaded portion 315 may be attached to an anchor, such as anchor 429 via end connector assembly 313, thereby not allowing the threaded portion 315 to move upwardly or downwardly. In such a situation, adjuster 312, in actuality, moves upwardly and downwardly relative to the threaded portion 315. However, for convenience, the present invention describes movement of the threaded portions 315, 316 relative to the adjuster 312, and the invention should not be limited as described herein.

The locking sleeve 311 is shown, in FIG. 11, lowered onto the end connector assembly 313 of the telescoping ratchet load binder 300 resulting in rotationally locking the two components together preventing further twisting.

FIG. 12 illustrates a side perspective view of various embodiments of a system utilizing chain 328 and anchor hardware 129 with a fully extended prior art ratchet load binder tensioner apparatus 10, compared with a fully extended telescoping ratchet load binder tensioner apparatus 300 connected to a system utilizing chain 328 and anchor hardware 429 of the present invention. The comparison illustrates how the additional telescoping feature of the threaded portion 316 into the cavity 322, and the addition of an end connector assembly 313, provides an improvement of the present apparatus over a prior art apparatus by providing a chain tensioning apparatus that provides a tie down with a shorter length profile providing a means to secure equipment with low ground clearance.

Specifically, FIG. 12 shows distance 330 that further illustrates the advantage of the shorter length profile of the present apparatus providing additional clearance so as to accommodate equipment with lower ground clearance.

Figure 13:
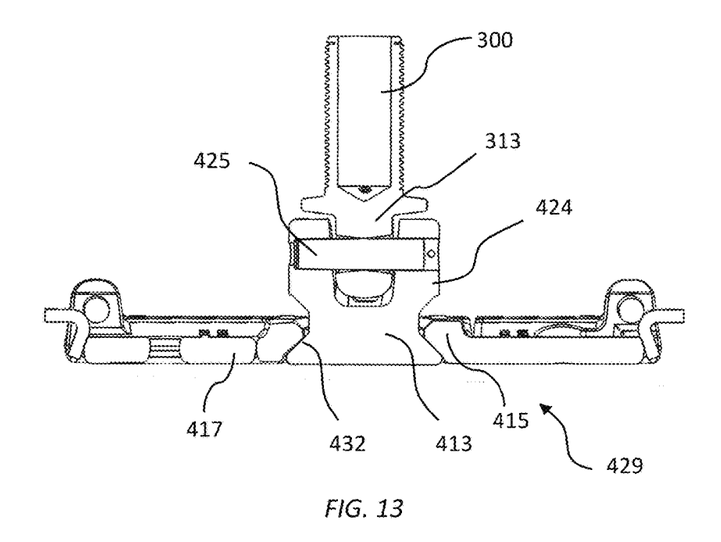
FIG. 13 illustrates a side cut-away view of a swivel anchor apparatus connected with a telescoping ratchet load binder tensioner in an alternate embodiment of the present invention.
Figure 14:
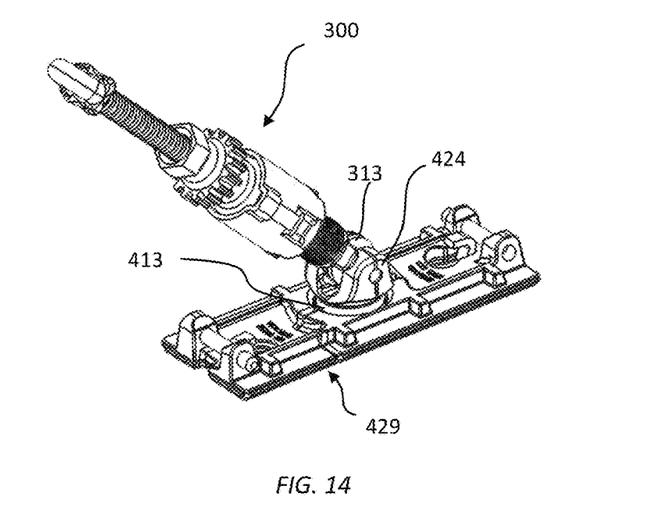
FIG. 14 illustrates a perspective view of a telescoping ratchet load binder tensioner in combination with a swivel anchor apparatus in an alternate embodiment of the present invention, with the telescoping ratchet load binder tensioner rotated or swiveled about a central axis of the swivel anchor apparatus and positioned in a longitudinal direction.
Figure 15:
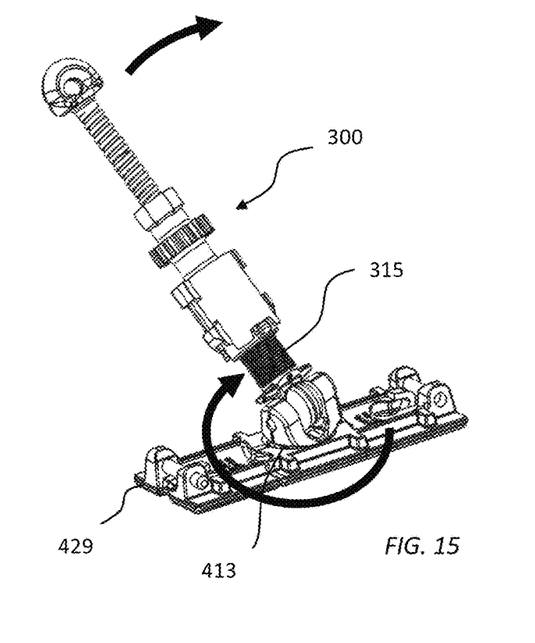
FIG. 15 illustrates a perspective view of a telescoping ratchet load binder tensioner in combination with a swivel anchor apparatus in an alternate embodiment of the present invention, with the telescoping ratchet load binder tensioner rotated or swiveled about a central axis of the swivel anchor apparatus and positioned in a lateral direction.

FIG. 13 illustrates a cross-sectional view of an anchor 429 in an alternate embodiment of the present invention, and as further illustrated in FIGS. 14 and 15. The anchor 429 may provide a connection point for a tie down binder, such as the telescoping ratchet load binder tie down apparatus 300 of the present invention, as described above, but may also be utilized with other ratchet load binder tie downs, and the invention should not be limited as described herein.

The anchor 429 and components thereof may provide a swivel 413 allowing a 360 degree freedom of movement about a central vertical axis for a ratchet load binder tie down apparatus. The swivel 413 may provide an end link 424 and a conical surface 432 in the anchor 429. The swivel 413, therefore, is free to rotate about the vertical central axis in the anchor 429. The conical surface 432 of the swivel 413 may be held by a mating conically-shaped plate 415 disposed thereover, and a base plate 417 disposed therebeneath holding the swivel 413 is position within the anchor 429.

The end link 424 of the swivel 413 may connect to the telescoping ratchet load binder tie down apparatus, or other binder tie down apparatus, via pin 425. Thus, the pin 425 allows the ratchet load binder tie down apparatus 300 to swivel upwardly and downwardly on a horizontal axis through pin 425. As described above, the swivel 413 allows 360 degree swiveling of the tie down apparatus about the central axis thereof, and with the movement of the apparatus along horizontal axis through pin 425, the ratchet load binder apparatus may be swiveled and moved into any desired position.

FIG. 14 illustrates a perspective view of a telescoping ratchet load binder tensioner 300 in combination with swivel 413 of anchor 429 in the alternate embodiment of the present invention. As shown in FIG. 14, the tensioner 300 may be positioned in a longitudinal direction with respect to the anchor 429, where the longitudinal direction is the direction of the lengthwise direction of the anchor 429.

The swivel 413 may allow the tensioner 300 to swivel therearound, as illustrated in FIG. 15, illustrating the tensioner 300 positioned in a lateral direction relative to the lengthwise direction of the anchor 429.

Figure 16:
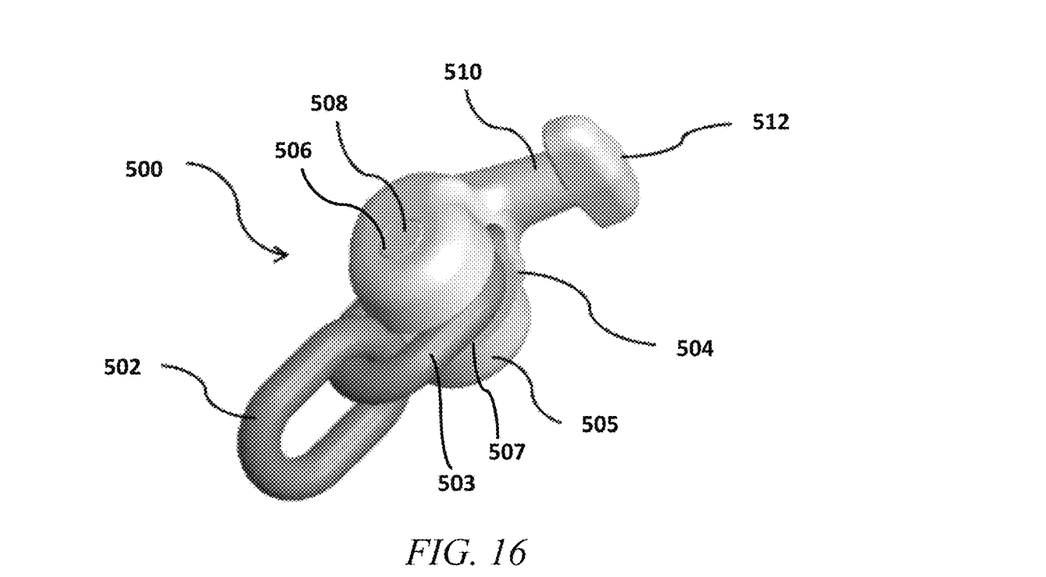
FIG. 16 illustrates tie down chain assembly in an embodiment of the present invention.

FIG. 16 illustrates a perspective view of a tie-down chain assembly 500 in an embodiment of the present invention. Specifically, tie-down chain assembly 500 comprises a length of chain 502 that may extend from a railcar deck, or from a component interconnected therewith, such as the telescoping ratchet binder tensioner 100 or 300, as described herein, or any other component useful for tying down an item, such as an item of heavy machinery, to a deck of a railcar. Specifically, interconnected with at least one link 503 of the length of chain 502 may be a clevis T-hook assembly 504 comprising a base element 505 comprising a slot 507 for receiving the chain link 503 therein. Further, the clevis T-hook assembly 504 may comprise a clevis socket 506 having a pin 508 disposed therethrough for interconnecting the clevis tee hook 504 with the chain link 503. The pin 508 may further have a cotter pin (not shown) that may be used for holding the pin 508 in placed within the clevis socket 506. The clevis T-hook 504 may further comprise an extending neck 510 extending angularly out and away from the base 505 and having a T-hook element 512 disposed on a terminal end thereof. The T-hook element 512 may interconnect with a suitable receiving element (not shown) that may be utilized for tying down heavy machined on a railcar deck.

Figure 17:
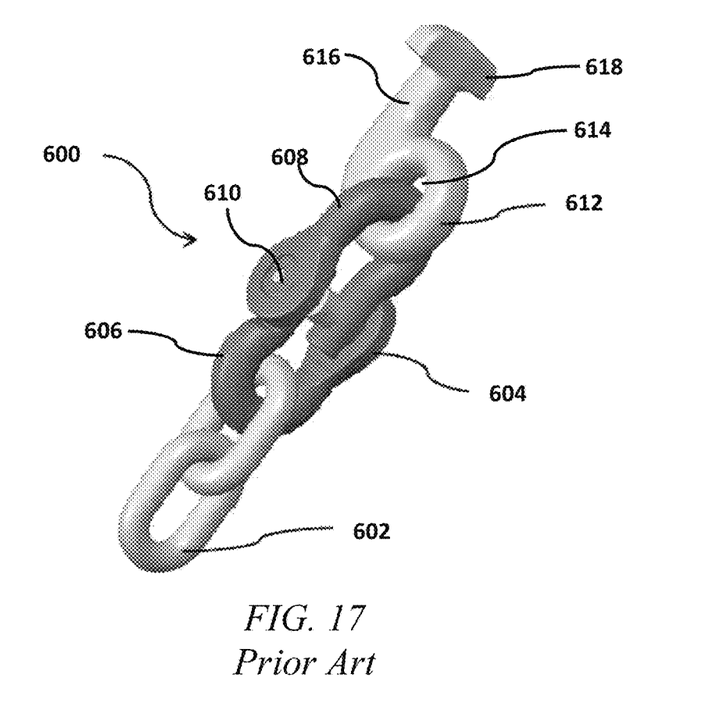
FIG. 17 illustrates a prior art tie down chain assembly.

A prior art chain assembly 600 is illustrated in FIG. 17. The prior art chain assembly 600 includes a length of chain 602 interconnected with a connector element 604. The connector element 604 has a first U-shaped element 606 and a second U-shaped element 608, interconnected to one another via a pin 610. Attached to the connector element 604 is a T-hook eyebolt assembly 612 having an eyebolt 614 through which the second U-shaped element 608 is disposed therethrough, an extending neck 616 and a T-hook element 618.

Thus, compared to a prior art chain assembly 600, illustrated in FIG. 17, the tie-down chain assembly 500 of the present invention may utilize less parts that would otherwise be more prone to failure. Therefore, the tie-down chain assembly 500 may impart sufficient strength and security to heavy machinery that is tied-down therewith.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A telescoping ratchet load binder tensioning apparatus comprising:
   a first end comprising a first connector and first threaded shaft portion;
   a second end comprising a second connector and a second threaded shaft portion, wherein the second threaded shaft portion comprises an internal cavity configured to receive the first threaded shaft portion, and further wherein the second threaded shaft portion further comprises a first engagement element protruding from the second threaded shaft portion;
   a length adjuster housing comprising first mating threads on a first inside surface of a first end of the housing and second mating threads on a second inside surface of a second end of the housing, wherein the first mating threads mate with the first threaded shaft portion and the second mating threads mate with the second threaded shaft portion,
   wherein turning the housing about the first and second threaded shaft portions in a first direction causes the first threaded shaft portion to move directionally toward the second threaded shaft portion, and further wherein the length adjuster housing comprises a second engagement element protruding from the length adjuster housing; and
   a locking sleeve slidably disposed on the length adjuster housing wherein the locking sleeve comprises a first mating element configured to engage the first engagement element protruding from the second threaded shaft portion, the locking sleeve further comprising a second mating element configured to engage the second engagement element protruding from the length adjuster housing, wherein the locking sleeve is configured to slide over the length adjuster housing and engage the first engagement element with the first mating element and the second engagement element with the second mating element thereby preventing the length adjuster housing from moving.

2. The telescoping ratchet load binder tensioning apparatus of claim 1 wherein the first connector is an eye bolt.

3. The telescoping ratchet load binder tensioning apparatus of claim 1 wherein the second connector is an eye bolt.

4. The telescoping ratchet load binder tensioning apparatus of claim 1 wherein the first threaded shaft portion comprises a first thread pitch and the second threaded shaft portion comprises a second thread pitch, wherein the first thread pitch and the second thread pitch are different.

5. The telescoping ratchet load binder tensioning apparatus of claim 4 wherein the first thread pitch is greater than the second thread pitch.

6. The telescoping ratchet load binder tensioning apparatus of claim 4 wherein the second thread pitch is greater than the first thread pitch.

7. The telescoping ratchet load binder tensioning apparatus of claim 1 wherein the first threaded shaft portion comprises a first thread pitch and the second threaded shaft portion comprises a second thread pitch, wherein the first thread pitch and the second thread pitch are the same.

8. The telescoping ratchet load binder tensioning apparatus of claim 1 comprising:
a retracted configuration, wherein the first threaded shaft portion is disposed within the internal cavity of the second threaded shaft portion.

9. The telescoping ratchet load binder tensioning apparatus of claim 8 comprising:
an extended configuration, wherein the first threaded shaft portion is disposed away from the second threaded shaft portion.

10. The telescoping ratchet load binder tensioning apparatus of claim 1 wherein the second connector is connected to a deck of a transporter vehicle.

11. The telescoping ratchet load binder tensioning apparatus of claim 1 comprising:
an anchor connected to the second connector.

12. The telescoping ratchet load binder tensioning apparatus of claim 11 wherein the anchor comprises a swivel connected to the second connector, wherein the swivel turns about a vertical axis.

13. The telescoping ratchet load binder tensioning apparatus of claim 12 wherein the swivel turns 360 degrees about the vertical axis.

14. The telescoping ratchet load binder tensioning apparatus of claim 12 wherein the anchor comprises a pin disposed through the second connector thereby connecting the second connector to the anchor, wherein the second connector rotates about the pin.

15. The telescoping ratchet load binder tensioning apparatus of claim 1 further comprising:
a chain assembly connected to the first connector, the chain assembly connected to an item for transport.

16. The telescoping ratchet load binder tensioning apparatus of claim 1 further comprising:
a chain assembly connected to the first connector, wherein the chain assembly comprises at least one chain link and a clevis tee hook comprising a base element having a slot configured to receive the chain link, a socket disposed through the base element, a pin extending through the socket configured to hold the chain link within the slot, a neck extending from the base element, the neck having a T-hook element on a terminal end of the neck.

* * * * *